US009936455B2

(12) United States Patent
Rothschild (10) Patent No.: US 9,936,455 B2
(45) Date of Patent: *Apr. 3, 2018

(54) SYSTEMS AND METHODS FOR REDUCING ELECTROMAGNETIC RADIATION EMITTED FROM A WIRELESS HEADSET

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,870

(22) Filed: Oct. 13, 2014

(65) Prior Publication Data

US 2017/0135042 A1    May 11, 2017

Related U.S. Application Data

(63) Continuation of application No. 13/329,463, filed on Dec. 19, 2011, now Pat. No. 8,862,058.

(51) Int. Cl.
| | |
|---|---|
| *H04W 52/02* | (2009.01) |
| *H04W 4/00* | (2018.01) |
| *H04B 1/3827* | (2015.01) |
| *H04W 76/02* | (2009.01) |
| *G08C 23/04* | (2006.01) |
| *G10L 15/22* | (2006.01) |
| *G10L 15/08* | (2006.01) |
| *H04W 84/12* | (2009.01) |

(52) U.S. Cl.
CPC ........ *H04W 52/0235* (2013.01); *G08C 23/04* (2013.01); *G10L 15/08* (2013.01); *G10L 15/22* (2013.01); *H04B 1/385* (2013.01); *H04W 4/008* (2013.01); *H04W 76/023* (2013.01); *G10L 2015/088* (2013.01); *G10L 2015/223* (2013.01); *H04B 2001/3866* (2013.01); *H04W 84/12* (2013.01)

(58) Field of Classification Search
CPC .. H04M 1/6066; H04M 1/05; H04M 2250/02; H04M 1/0254; H04M 1/0258; H04M 1/6033; H04M 1/6058; H04M 1/7253; H04B 1/385–2001/3872; H04W 52/0235; H04W 52/0225; H04W 4/008
USPC ................................. 455/569.1, 575.2, 41.3
See application file for complete search history.

(56) References Cited

U.S. PATENT DOCUMENTS

| | | | | |
|---|---|---|---|---|
| 7,010,332 | B1 * | 3/2006 | Irvin ....................... | H04M 1/05 |
| | | | | 379/106.02 |
| 7,072,686 | B1 * | 7/2006 | Schrager ........... | H04M 1/72519 |
| | | | | 379/88.01 |
| 7,945,297 | B2 * | 5/2011 | Philipp ................ | H04R 1/1041 |
| | | | | 455/557 |

(Continued)

*Primary Examiner* — Gennadiy Tsvey
(74) *Attorney, Agent, or Firm* — Eugenio J. Torres-Oyola; Victor Rodriguez-Reyes Ferraiuoli LLC (57) ABSTRACT

Systems and methods for reducing the emission of radiation by wireless headsets during sleep mode are provided. One system comprises a mobile device and a wireless headset. The mobile device includes a transmission module for transmitting data or voice signals over a microwave frequency band. The wireless headset comprises a transceiver that enables the wireless headset to wirelessly communicate with the mobile device during a time when the mobile device and wireless headset are linked within a personal area network (PAN). The wireless headset is configured to receive instructions from the mobile device to enter a sleep mode, wherein the transceiver is turned off during the sleep mode.

12 Claims, 6 Drawing Sheets

(56) References Cited

U.S. PATENT DOCUMENTS

| | | | |
|---|---|---|---|
| 8,045,727 B2* | 10/2011 | Philipp | H04R 1/1041 381/370 |
| 2002/0004809 A1* | 1/2002 | Golliver | G06F 9/30025 708/622 |
| 2004/0132447 A1* | 7/2004 | Hirschfeld | H04M 1/6033 455/426.2 |
| 2005/0271250 A1* | 12/2005 | Vallone | G06K 9/00288 382/103 |
| 2006/0252457 A1* | 11/2006 | Schrager | H04M 1/6066 455/556.1 |
| 2008/0132294 A1* | 6/2008 | Bennett | H04B 1/1615 455/569.1 |
| 2008/0282100 A1* | 11/2008 | Chen | G06F 1/3203 713/322 |
| 2009/0262205 A1* | 10/2009 | Smith | H04N 5/2251 348/211.4 |
| 2010/0245585 A1* | 9/2010 | Fisher | H04M 1/6066 348/164 |
| 2011/0106954 A1* | 5/2011 | Chatterjee | G06F 1/1632 709/227 |
| 2012/0189140 A1* | 7/2012 | Hughes | H04M 3/56 381/123 |

\* cited by examiner

SYSTEMS AND METHODS FOR REDUCING ELECTROMAGNETIC RADIATION EMITTED FROM A WIRELESS HEADSET

CROSS-REFERENCE TO RELATED APPLICATION

This application is a continuation of and claims priority under 35 U.S.C. § 120 from U.S. patent application Ser. No. 13/329,463 filed on Dec. 19, 2011 and issued as U.S. Pat. No. 8,862,058 on Oct. 14, 2014, the entirety of all of which is incorporated herein by reference.

BACKGROUND

1. Field

The present disclosure relates generally to wireless headsets, and more particularly, to systems and methods for reducing the amount of power consumed and the amount of radiation emitted from wireless headsets during a sleep mode.

2. Description of Related Art

Portable digital devices are now common. Examples include the various Windows™ Pocket PC devices which have an operating system created by Microsoft Corporation of Redmond, Wash. Other examples include Android devices licensed by Google of Mountain View, Calif. Other devices include various mobile phone devices including many that have built-in camera imaging devices. Still other portable digital devices include portable media players from Creative Media of Singapore, Samsung of South Korea, Archos, Inc. of Irvine, Calif. and Apple Computers, Inc. of Cupertino, Calif. Additionally, Sony of New York and Japan manufacture a portable game playing device called the Sony PSP™ (PlayStation Portable).

Increasingly, many of these portable media devices include a means of transmitting and receiving digital content. Various communications technologies are frequently built into these devices. Examples of portable communicating devices include mobile phones which employ GSM, COMA, W-CDMA, and FOMA technology, among other standards, to send and receive data in addition to handling voice communications. Many of the portable media devices also include transmission capabilities including WiFi (IEEE 802.11 a, b, g and x among others), Bluetooth, infrared, etc. to allow the user to transmit and receive digital content. Furthermore, some mobile devices having transmission capabilities can use this capability to achieve voice communications such as by Voice over Internet Protocol (VoIP) when connected to the Internet or other packet switched networks.

Due to these advanced features, mobile telephones and other mobile devices are some of the most prevalent consumer electronic devices. Hundreds of millions of these devices are sold each year and are used around the world.

However, an issue of concern with the extensive use of mobile devices, particularly mobile phones, is that during use mobile devices are paced next to the user's head, thereby exposing the user's head to electromagnetic radiation as a result of transmitting and receiving cellular signals between the mobile device and mobile communication towers. Bluetooth-enabled devices are often used with mobile phones to not only allow the user to talk hands-free, but also to move the powerful transmitter of the mobile device away from the user's head. For example, a wireless headset may be worn on the user's ear while the actual mobile phone may be kept in a pocket of the user's clothing, on a belt clip, in a purse, or in another area away from the user's head. In this scenario, a Bluetooth enabled wireless headset and the mobile device are able to communicate over a short range communication channel using less power than the cellular transmissions, thereby resulting in much less radiation exposure to the user's head.

Often, a user may leave a wireless headset on his or her ear even when not in use. When the user wishes to make a call or is receiving a call, the headset is already in place and the user does not have to insert the device into or on his or her ear. One problem with this practice though is that when a wireless headset is in a sleep mode, the device continues to operate at low levels by sniffing for a signal so as to know when to awaken. Therefore, the user may be exposed to unwanted radiation from the wireless headset even during the times when the device is in the sleep mode. Various studies are now reporting that this radiation, although small may be harmful to humans especially because of continual exposure.

SUMMARY

Systems and methods for reducing the emission of radiation by wireless headsets during sleep mode are provided. One system comprises a mobile device and a wireless headset. The mobile device includes a transmission module for transmitting data or voice signals over a microwave frequency band. The wireless headset comprises a transceiver that enables the wireless headset to wirelessly communicate with the mobile device during a time when the mobile device and wireless headset are linked within a personal area network (PAN). The wireless headset is configured to receive instructions from the mobile device to enter a sleep mode, wherein the transceiver is turned off during the sleep mode.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described herein below with reference to the accompanying drawings. In the following description, well-known functions or constructions are not described in detail to avoid obscuring the present disclosure in unnecessary detail.

Systems and methods are provided for reducing power consumption of a mobile device and for reducing the emission of radiation to which a user of a mobile device is exposed. The mobile device of the present disclosure may comprise, e.g., a cellular phone, GSM phone, media player, personal digital assistant (PDA), etc. In addition to the mobile device, the user may utilize a wireless peripheral device, such as a Bluetooth-enabled headset, which can be used to move a major source of cellular radiation, i.e., the mobile phone, away from close proximity to the user's head. According to embodiments herein, a wireless peripheral device (e.g., Bluetooth headset) may include circuitry for enabling an alternative sleep mode for reducing the consumption of battery power of the wireless device and for reducing the user's radiation exposure.

Figure 1A:
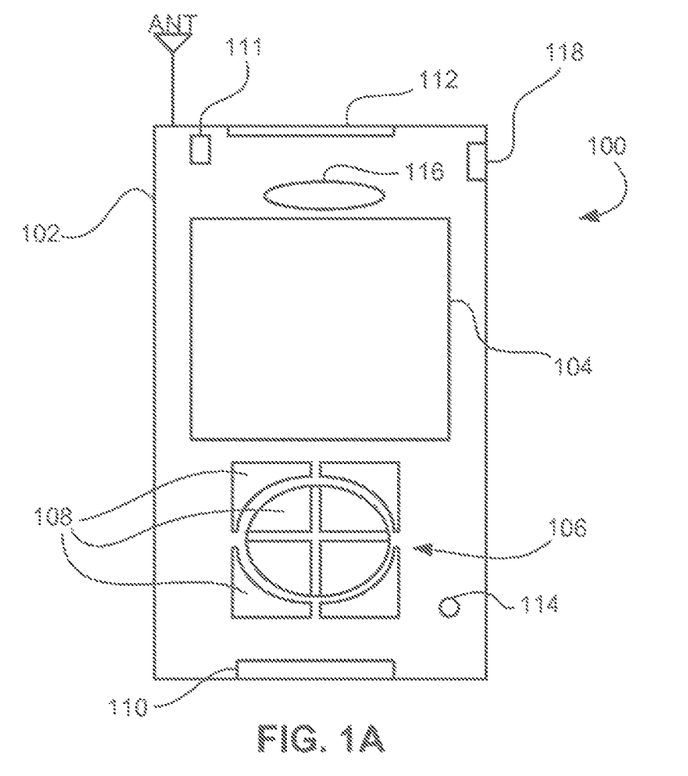
FIG. 1A is front view of a mobile device for reducing radiation exposure according to an embodiment of the present disclosure.

Referring to FIG. 1A, a mobile device 100 in accordance with an embodiment of the present disclosure is illustrated. The mobile device 100 includes various electrical components, which will be described in detail below, disposed in a generally rectangular housing 102. A display module 104 is provided for displaying video and image media content, such as movies, animations, etc., and a speaker 116 is provided for producing audio, e.g., voice, music, a soundtrack associated with a video, or other audio. An audio port 118 will be configured to receive a plug or connector from a headphone, stereo system, etc. to stream the audio to the connected device. It is to be appreciated that when an external device is connected to the audio port 118 the speaker 116 will be disabled. Input module 106 includes a plurality of buttons 108 for inputting data and navigating through a plurality of menus. A touch screen overlaid upon the display module 104 may also be coupled to the input module for facilitating user input. The mobile device 100 further includes a storage module 110 for storing a plurality of content.

A transmission module 112 is provided for transmitting/receiving data and/or content to another device, e.g., a personal computer, a personal digital assistant (PDA), a server residing on the Internet, etc. The mobile device 100 may include a microphone 114 for acquiring audio from the user of the device to input data.

Figure 2:
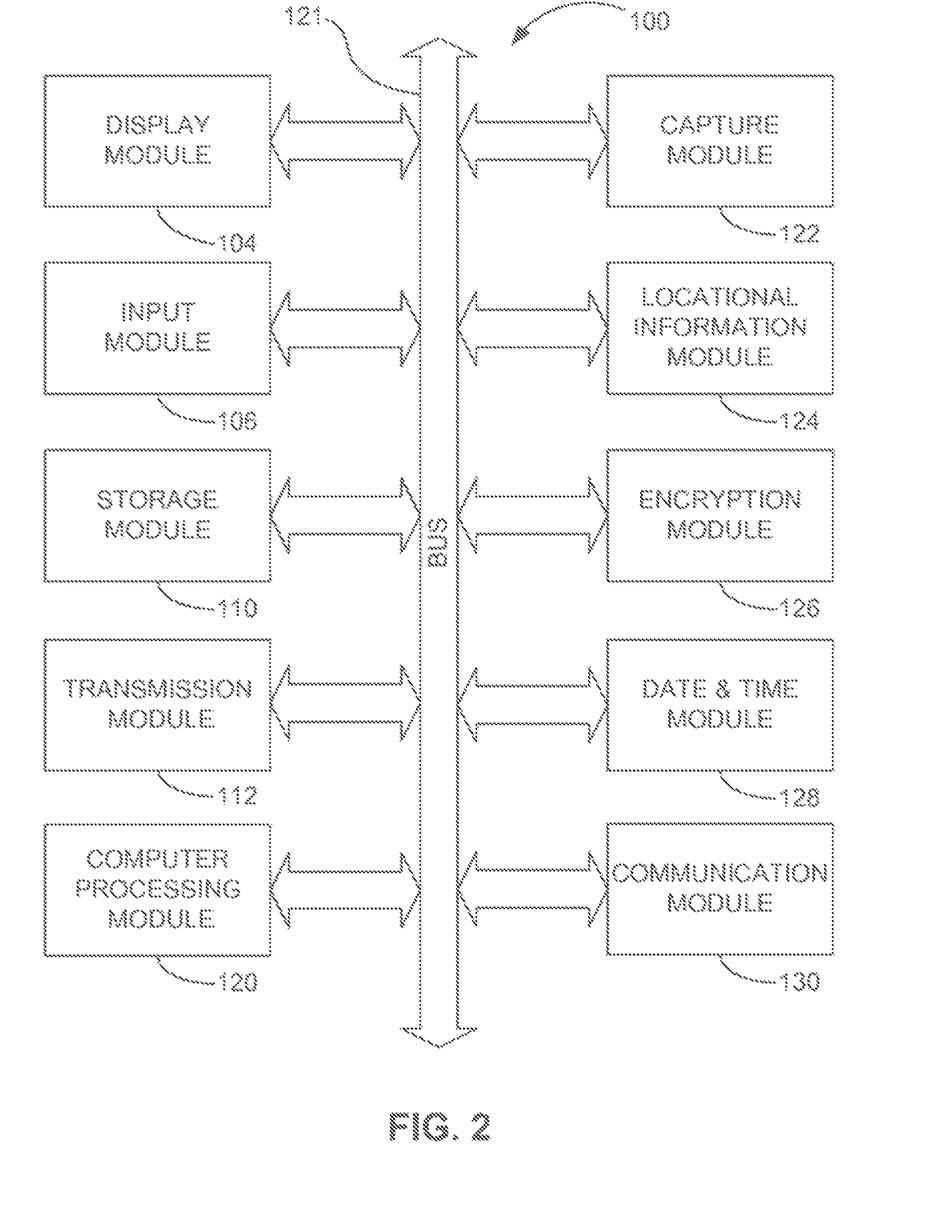
FIG. 2 is a block diagram of various modules included in the mobile device illustrated in FIG. 1A.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM) (not shown). The various processes and functions described herein may either be part of the micro instruction code or part of an application program (or a combination thereof) which is executed via the operating system. Exemplary operating systems include but are not limited to SymbianOS, Apple iOS, Windows Mobile/Windows CE, Palm OS, Linux, Blackberry OS, BREW, etc. which have been developed for mobile computing applications and can handle both data computing and communication applications, e.g., voice communications.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer processing module 120 may further include, in addition to a microprocessor, a digital signal processor (DSP) for decoding stored audio, video and photo files to be played on the media device 100. As is known in the art, the DSP may include several known decompression algorithms for decompressing stored media content, e.g., a MP3 file. The device 100 of the present disclosure will support various file types including but not limited to Microsoft Windows Media Video files (.wmv), Microsoft Photo Story files (.asf), Microsoft Windows Media Audio files (.wma), MP3 audio files (.mp3), MPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The device 100 will also contain a display module 104 for displaying digital information such as video files, image files, text files, etc. This display may be in any current form in the art, including Liquid Crystal Displays (LCD), Light emitting diode displays (LED), Cathode Ray Tube Displays (CRT) or any other type of display currently existing or existing in the future. The display module 104 may also include an audio output device, e.g., a speaker 116, audio port 118, etc., allowing the user to also hear audio output from the device 100, e.g., audio associated with a video, a MP3 file, etc.

The mobile device 100 of the present disclosure will contain a user input module 106 to either receive user instructions via text input by the way of buttons 108, a standard keyboard interface coupled to the device, or a character recognition capture device which translates user text input into alphanumeric characters. Preferably, the character recognition device is a touch screen which overlays the display module 104 and text is entered via a pen-like stylus. Such input devices are standard and currently available on many electronic devices including portable digital assistants (PDAs) and cellular telephones. Optionally, microphone 114 may be further coupled to the input module 106 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user will utilize the user input module 106 to enter various data, for example, to enter payment information, to initiate communication with a remote server, to flag desired content to be downloaded, to request an initial selection of media content to be downloaded, etc.

The storage module 110 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SO (Secure Digital) memory; or any other memory storage that exists currently or will exist in the future.

The transmission module 112 will enable the device 100 to transmit or transfer information to other computing devices and to receive information from other computing devices, e.g., digital media files, encryption/decryption keys, etc. The transmission module 112 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Buetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data. The transmission module 112 will compress and encode the encrypted information for transmission using any known wireless communication technology. In one embodiment, antenna ANT is coupled to the transmission module 112 for extending the wireless transmission range of the device 100.

Figure 1B:
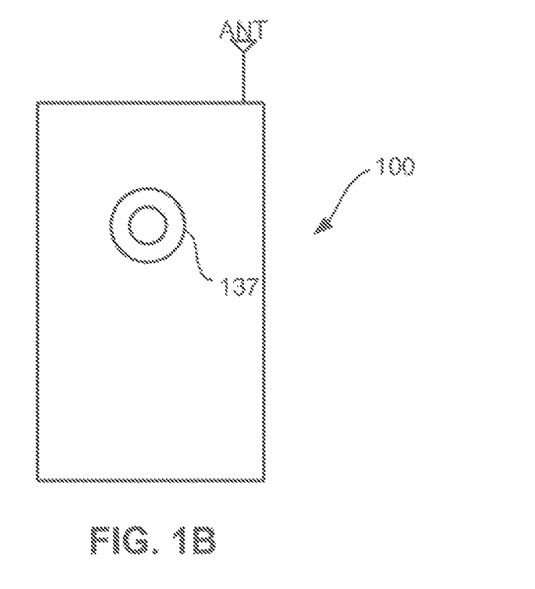
FIG. 1B is a rear view of the mobile device illustrated in FIG. 1A for reducing radiation exposure.
Figure 1C:
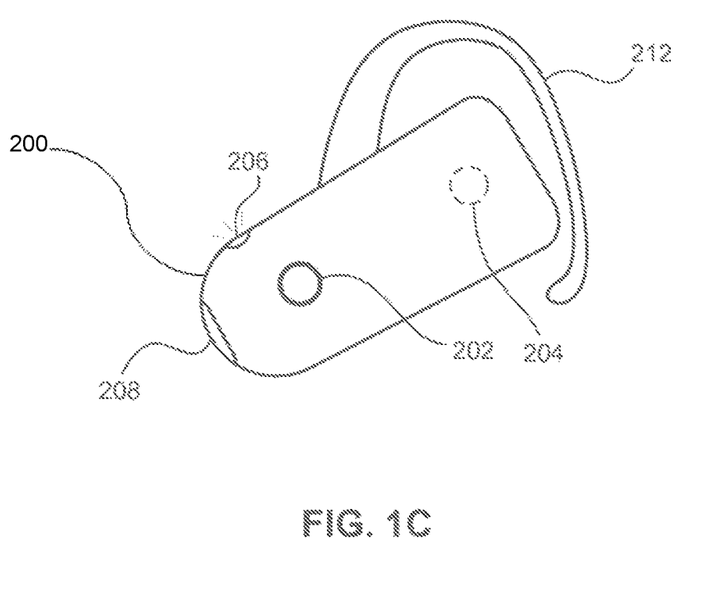
FIG. 1C is front view of a first embodiment of a wireless headset for communicating with the mobile device illustrated in FIG. 1A.
Figure 1D:
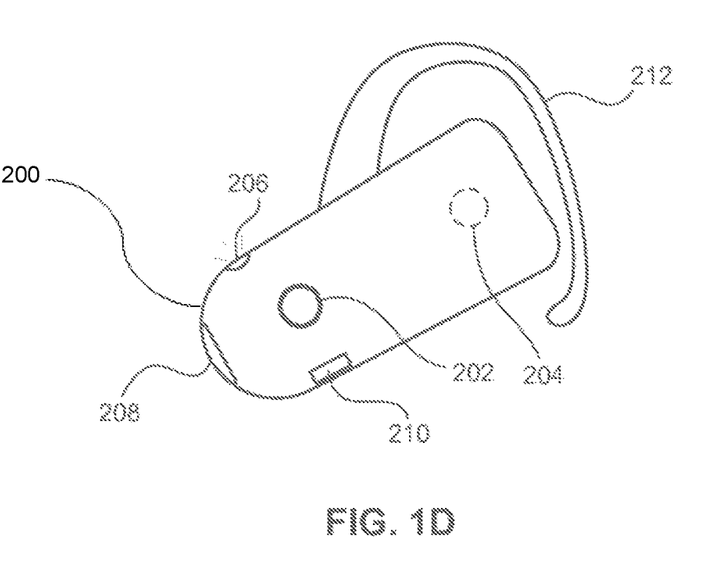
FIG. 1D is a front view of a second embodiment of a wireless headset for communicating with the mobile device illustrated in FIG. 1A.

According to some embodiments, the transmission module 112 may be configured to communicate with a wireless headset, such as wireless headset 200 shown in FIGS. 1C and 1D. The devices may communicate with each other over a short distance using the Industrial, Scientific, and Medical (ISM) frequency range spanning from 2400 MHz to 2483 MHz. The transmission module 112 of the mobile device 100 (or the mobile device 100 itself) in some respects may be referred to as a master device for controlling some of the features of a slave device, e.g., the wireless headset 200. In this arrangement, the devices can create a personal area network (PAN) or piconet to enable secure wireless communications.

To allow proper communication, the wireless headset is kept within a certain distance from the transmission module 112. According to Bluetooth standards, for example, the maximum range may be about five meters for class 3 devices. During operation, a class 3 device may consume up to about 1 mW of power. Devices under classes 1 and 2 may consume up to about 100 mW and 2.5 mW, respectively, When the transmission module 112 and wireless headset 200 are inactive, the master device (i.e., the transmission module 112 or mobile device 100) sends a signal to the slave device (i.e., the wireless headset 200) to enter into a sleep mode to conserve battery power. In a conventional deep mode, a transceiver of the wireless headset remains active and periodically sniffs or listens for commands from the master. When the slave detects a beacon signal or a command directed to the slave's address, the slave device wakes up and responds to the master.

However, according to embodiments disclosed herein, the transmission module 112 and wireless headset 200 are configured to provide alternative sleep modes. In particular, the sleep modes described in the present disclosure do not use the transceiver of the wireless headset 200 to continually sniff for the master's signals. Instead, the sleep modes described herein allow the transceiver to shut off while alternative systems and methods are utilized to determine when to wake up and turn the transceiver back on. In this respect, the transceiver does not operate according to conventional sleep modes, which continues to use, albeit, at intermittent times, the ISM band. Thus, according to the embodiments of the present disclosure, a user who keeps a wireless headset attached to his or her ear, even when the device is not in operation, will not be exposed to unnecessary microwave radiation.

The mobile device 100 further comprises a light emitter 111 that is configured to emit a certain light wave, light signal, or light pattern. For example, the light emitter 111 may be an infrared diode or other dement for emitting infrared signals. When a call is received by the mobile device 100, the light emitter 111 is configured to send a light signal along a line of sight to the wireless headset 200 to signal the headset 200 to awaken from sleep mode. According to various embodiments, the light emitter 111 may be configured to emit either visible or invisible light.

A capture module 122 is provided to capture an image desired by the user in digital form. The capture module 122 includes an image sensor, an analog to digital (A/D) converter and a digital signal processor (DSP). Referring to FIG. 1B, when a user desires to capture an image, a lens 137 disposed on a rear side of the device is aimed at a subject of the image and is used in conjunction with display module 104 for positioning a subject of the image in lieu of a viewfinder. Light is allowed to enter through the lens 137 and shine on the image sensor, e.g., a charge-coupled device (CCD) or complimentary metal-oxide semiconductor (CMOS). The image sensor includes preferably millions of photosensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 110.

A locational information module 124 will be provided for determining a location of the device 100 and/or user. The locational information module 124 may include a receiver and antenna ANT employing conventional locational information processing technology such as Global Positioning Satellite (GPS) Technology, Loran Technology, or any other available locational technology, to indicate the exact location, e.g., latitude, longitude and altitude, of the device 100. Exemplary GPS receivers and antennas are described in U.S. Pat. Nos. 5,654,718 and 6,775,612, the contents of both of which are herein incorporated by reference. It is to be appreciated that the latitude, longitude and altitude may be used to interact with maps stored in memory or in the storage module 11 0 of device 100 to determine the city, state or address of the location the device 100.

The mobile device 100 may also include an encryption module 126. The encryption module 126 will use conventional code encryption algorithms currently in use or that will be in use in the future such as symmetric-key algorithms, e.g., DES, Triple-DES, Blowfish, RC2, RC4, RC5, etc., and asymmetric-key algorithms, e.g., Diffie-Hellman, RSA, ElGamal, etc. to data that is stored in the storage module 110. The encryption module 126 may also encrypt photos or the pre-defined massage before transmission to another device or server.

Furthermore, the device 100 will include a date and time module 128. The date and time module 128 will use standard computer chip processing technology widely in use, e.g., a crystal, or alternatively, input from a GPS receiver to supply the date and time.

In one embodiment, the device 100 according to the principles of the present disclosure is embodied as a mobile phone including the modules and architecture illustrated in FIG. 2. In this embodiment, microphone 106 is further coupled to a communication module 130 for encoding a user's speech to be transmitted via antenna ANT using COMA, PCS, GSM or any other known wireless communication technology. The user will enter phone numbers to be dialed via the touch screen, or alternatively, as is known in the mobile phone art, the device 100 may include a full QWERTY keyboard as an input module to enter text information. In addition to producing audio from audio or multimedia content, speaker 116 will be coupled to the antenna ANT and a decoder for receiving and decoding voice communication from another mobile phone.

It is to be appreciated that the communication module 130 may include a single integrated circuit chip to perform data transfer and voice communications or a single module including a separate data transfer chip, e.g., a WiFi transceiver, and a separate voice communication chip, e.g., a COMA chip. In one embodiment, the communication module will operate on the wireless GPRS (General Packet Radio Service) data protocol or a 3G protocol such as W-COMA, COMA2000 and TO-SCOMA. Both the GPRS and 3G protocols have the ability to carry both voice and data over the same service.

It is to be appreciated that the device 100 described above is an exemplary device and may include all or a portion of the modules described above. Furthermore, it is to be appreciated that existing mobile devices, e.g., mobile phones, digital media playback device, may be used in accordance with the principles of the system and method of the present disclosure described below.

FIG. 1C depicts an embodiment of a wireless headset 200 according to a first embodiment. In the embodiment shown in FIG. 1C, the wireless headset 200 includes an earpiece 212 that is designed to fit around a top portion of the user's ear and be supported in a hands-free manner. The wireless headset 200 includes a power button 202 for turning the device on. When first powered on, the wireless headset 200 is configured to listen for a signal from the mobile device 100 to begin communication sessions. A light 206 is provided on the body of the wireless headset 200 for indicating that the power of the device is on or for indicating other features.

The wireless headset 200 further includes a speaker 204 on one side of the device for providing sound to the user. Voice signals received by the mobile device 100 (e.g., during a phone call) are transmitted to the wireless headset 200 and played on the speaker 204. A microphone 208 is provided on one end of the wireless headset 200 and is configured to pick up voice signals from the user. The voice signals are then transmitted from the wireless headset 200 to the mobile device 100, which can then transmit the signals to a remote caller via a communications network. The signals communicated between the mobile device 100 and the wireless headset 200 may be transmitted according to Blue tooth standards over the ISM band.

The wireless headset 200, according to various embodiments of the present disclosure, may be configured to enter a sleep mode when the device is turned on but inactive. Instead of entering a sleep mode involving the conventional detection of transmitted signals in the ISM range, the wireless headset 200 according to embodiments of the present disclosure is configured to use other types of sleep modes. The sleep modes defined herein may involve completely turning off the transceiver that receives and transmits ISM microwave signals.

In one embodiment (FIG. 1C), the microphone 208 may be left open during sleep mode to receive sound waves. For example, the microphone 208 may be configured to wait to receive a specific sound (e.g., a beep, a ringtone, a prerecorded message, or other sound) either from the mobile device 100 or from the user. In response to receiving the predetermined sound, the wireless headset 200 wakes up and turns on its transceiver to allow regular communication between the devices.

According to this embodiment of FIG. 1C. the wireless headset 200 may include one or more additional buttons that the user may press to record audio that may be used as a reference. Thus, the user can record a sound beforehand such that, during sleep mode, the wireless headset 200 can determine if the predetermined sound is heard. If so, then the wireless headset 200 is configured to wake up in response to hearing the sound. The wireless headset 200 includes additional circuitry in the body of the device for recording a specific sound and storing the recorded sound in a memory device. In some embodiments, the circuitry may implement voice recognition technology. Other additional circuitry may include switching circuitry for turning the transceiver on or off. Furthermore, the wireless headset 200 may also include circuitry for analyzing whether audio received during the sleep mode matches the predetermined sound stored in memory.

According to another embodiment for managing a sleep mode, and as shown in FIG. 1D, the wireless headset 200 includes a light sensor 210, such as an infrared sensor. When a call is received by the mobile device 100, for example, the light emitter 111 emits a light signal (infrared pattern). If the light sensor 210 on the wireless headset 200 is in the line of sight of the light emitter 111, the light sensor 210 will be able to detect the signal and wake from the sleep mode. Part of the waking process involves turning the transceiver on to enable regular operability. According to this embodiment, the wireless headset 200 may include switching circuitry for turning the transceiver on or off. Also, the headset 200 may include additional circuitry for analyzing the light signals received by the light sensor 210. Thus, the circuitry can determine whether the received light signals are the predetermined signals from the master device (ie., the corresponding mobile device 100) instructing the wireless headset 200 to wake up.

Figure 3:
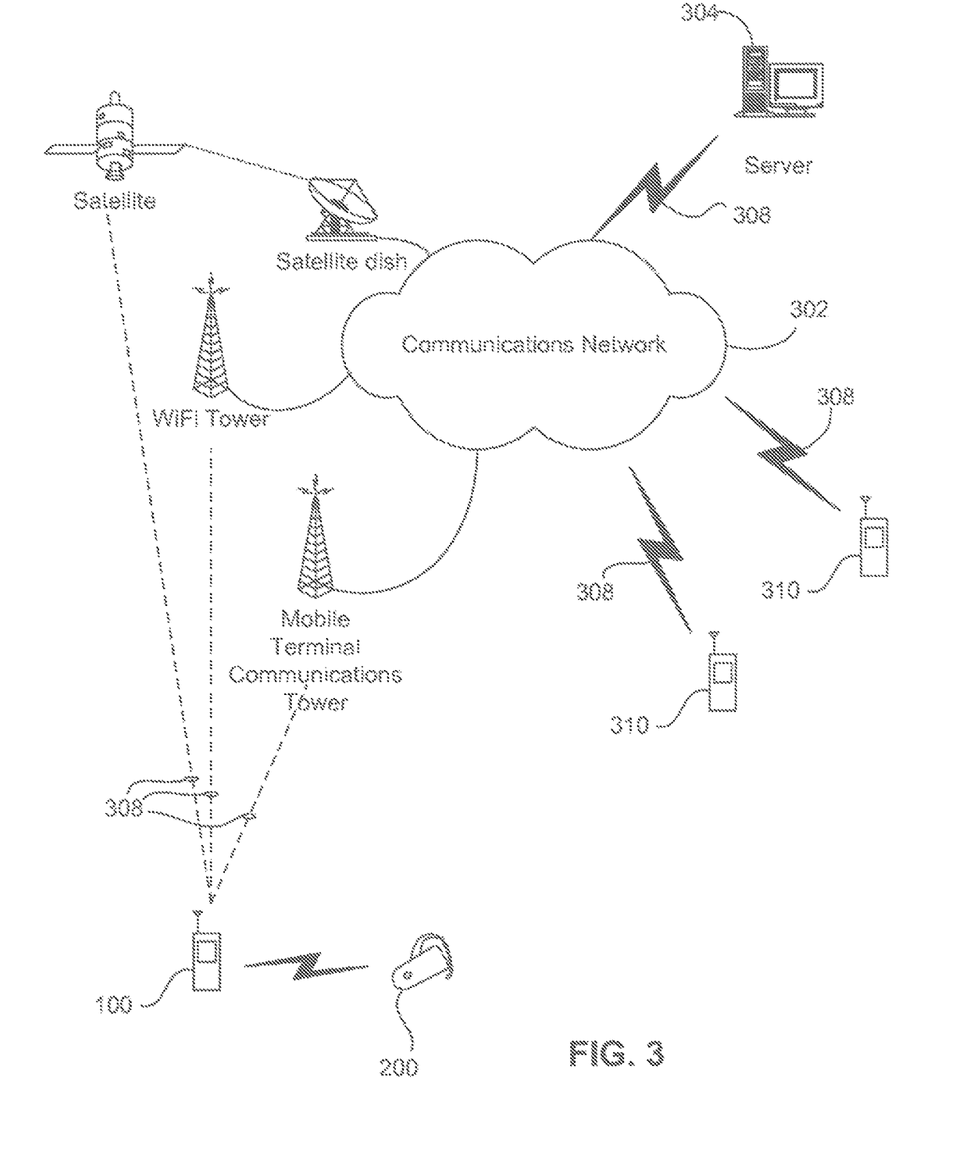
FIG. 3 illustrates a system for enabling cellular communication in accordance with an embodiment of the present disclosure.

Referring to FIG. 3, a system in accordance with the present disclosure is illustrated. The system includes a mobile device 100 as described above. The device 100 may communicate with a server 304 or another user 310 (e.g., a friend, relative, or other person) via a communication network 302. The user may also utilize a wireless headset 200, which is configured to communicate with the mobile device 100 within a PAN or piconet. The device 100, server 304, and contact 310 may be connected to the communications network 302, e.g., the Internet, by any known means, for example, a hardwired or wireless connection 308, such as dial-up, hardwired, cable, DSL, satellite, cellular, PCS, wireless transmission (e.g., 802.11 a/b/g), etc. It is to be appreciated that the network 302 may be any network known in the art including a telephone network (e.g., a plain old telephone service (POTS) network), a mobile phone network (e.g., cellular, PCS, GSM, etc.), a computer network, a switch data packet network, etc. In one embodiment, the network 302 may be a local area network (LAN), wide area network (WAN), the Internet or any known network that couples a plurality of computers and digital devices to enable various modes of communication via network messages. Furthermore, the server 304 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

Figure 4:
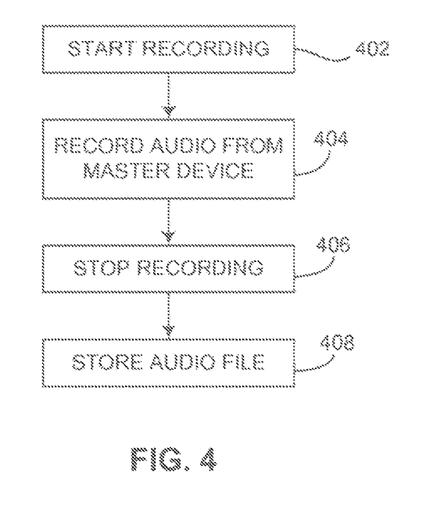
FIG. 4 illustrates a flow diagram of a method for recording an audio file.

FIG. 4 is a flow diagram illustrating a method for recording an audio sequence that may be used to wake the wireless headset 200 from sleep mode. In this embodiment, the method includes starting a recording, as indicated in block 402. The recording may be started by the user by pressing a button (e.g., the power button 202 or at least one other button on the wireless headset 200), pressing or holding down one or more buttons in a specific pattern or for a given time, giving a voice command into the microphone 208, or by other user input.

As indicated in block 404, the method includes recording audio from the master device. In this way, only the master device is able to awaken the sleeping slave device. The master device (e.g., the mobile device 100) may be configured to play a beeping sound, a ringtone, or other sound. In some embodiments, the recorded sound may come from a different source, such as a voice command from the user. Therefore, when the mobile device 100 rings or vibrates to indicate an incoming call, the user may wake the wireless headset 200 by issuing a command, such as "Wake up!" As indicated in block 406, at a certain time (e.g., after a few seconds or in response to a user input), the method stops recording. As indicated in block 408, the wireless headset 200 stores the audio file in a memory device within the headset.

Figure 5:
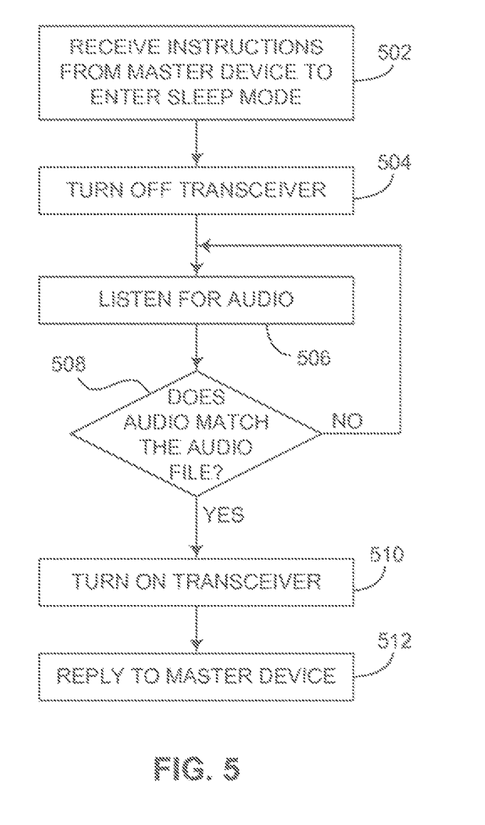
FIG. 5 illustrates a flow diagram of a method for reducing the emission of radiation in accordance with a first embodiment of the present disclosure.

FIG. 5 illustrates an embodiment of a method for waking the wireless headset from sleep in response to an audio prompt. In block 502, the method includes receiving instructions from the master device to enter a sleep mode. The signal from the master device may be a conventional command to slave devices to go to sleep. As indicated in block 504, the method includes turning off the transceiver of the wireless headset 200. At this stage, the transceiver may be completely turned off, thereby producing no microwave radiation. After the transceiver is shut off, the device listens for audio, either at periodic times or continually. When audio is detected, it is compared with the audio file recorded according to the method of FIG. 4. As is indicated in decision block 508, if there is a match, the method proceeds to block 510. Otherwise, the method returns back to block 506 to keep listening until more audio is detected. As indicated in block 510, after it is determined that the detected audio matches the audio file, the transceiver of the wireless headset is turned back on to allow normal communication. In block 512, the headset replies to the master device 512 to continue regular short range transmissions.

Figure 6:
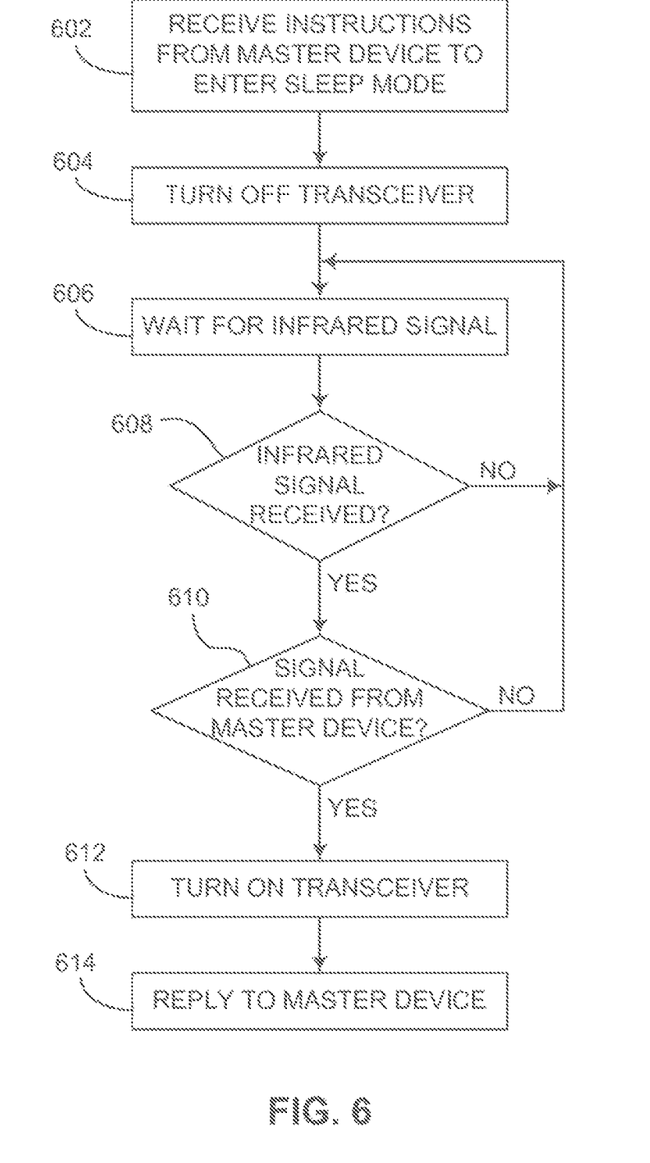
FIG. 6 illustrates a flow diagram of a method reducing the emission of radiation in accordance with a second embodiment of the present disclosure.

FIG. 6 is a method according to a second embodiment for allowing the wireless headset to sleep. As indicated in block 602, the headset receives instructions from the master device to enter the sleep mode. An alternative sleep mode is entered in this embodiment. In block 604, the transceiver is turned off and then, in block 606, the method waits for a light signal, which may be received by the light sensor 210 shown in FIG. 1D. As indicated in decision block 608, it is determined whether or not an infrared signal is received. If not, the method returns back to block 606 and waits for an appropriate light signal. If an infrared signal is received in block 608, the method proceeds to decision block 610. According to step 610, it is determined whether or not the signal that was received was from the master device. If so, the method proceeds to block 612. If the infrared signal was not from the master device, the method returns back to block 606 to waft for a valid signal. As indicated in block 612, after a valid infrared signal is received from the master device, the transceiver is turned back on, and the wireless headset replies to the master device (step 614).

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A system comprising:
a mobile device comprising a transmission module for transmitting at least one of data or voice signals over a microwave frequency band; and
a wireless headset comprising a transceiver that enables the wireless headset to wirelessly communicate with the mobile device during a time when the mobile device and wireless headset are linked within a personal area network (PAN);
wherein the wireless headset is configured to receive instructions from the mobile device to enter a sleep mode;
wherein the transceiver is turned off during the sleep mode;
wherein the wireless headset further comprises a microphone configured to receive audio during the sleep mode;
wherein the wireless headset further comprises match detecting circuitry configured to determine whether the received audio matches a predetermined audio file; and
wherein the predetermined audio file includes audio signals of a ringtone of the mobile device.

2. The system of claim 1,
wherein the wireless headset further comprises recording circuitry configured to record audio from the mobile device and store an audio file of the recorded audio.

3. The system of claim 1, wherein:
the mobile device comprises a light emitter configured to emit a light signal indicating a command to the wireless headset to awaken from the sleep mode; and
the wireless headset comprises a light sensor configured to sense the emitted light signal.

4. The system of claim 3, wherein the wireless headset further comprises light analyzing circuitry configured to determine when sensed light signals are valid light signals emitted by light emitter of the mobile device.

5. A method of enabling a sleep mode for a wireless headset, the method comprising:
receiving instructions from a master device to enter a sleep mode;
in response to receiving instructions to enter the sleep mode, turning off a transceiver of the wireless headset, the transceiver being configured to enable wireless short-range communication between the wireless headset and the master device;
waiting for a signal from the master device;
in response to receiving a valid signal from the master device, turning on the transceiver of the wireless headset; and
wherein waiting for the signal from the master device comprises listening for an audio signal from the master device.

6. The method of claim 5, further comprising determining whether detected audio signals match a pre-recorded audio file.

7. The method of claim 6, wherein the pre-recorded audio file is a recording of an audio output from the master device.

8. The method of claim 6, wherein the pre-recorded audio file is a recording of a voice command from a user of the wireless headset.

9. The method of claim 5, wherein the master device is a mobile phone device.

10. A wireless headset comprising:
a transceiver configured to wirelessly communicate with a mobile device during a time when the mobile device and wireless headset are linked within a personal area network (PAN), wherein, when the wireless headset is inactive, the transceiver is configured to receive instructions from the mobile device to enter a sleep mode;
switching circuitry configured to turn off the transceiver during the sleep mode;
a receiving mechanism for receiving a wake-up signal from the mobile device when the transceiver is turned off;
wherein the switching circuitry is configured to turn the transceiver on when the wake-up signal is received; and
wherein the receiving mechanism for receiving the wake-up signal comprises a microphone configured to receive an audio signal from the mobile device.

11. The wireless headset of claim 10, wherein the mobile device is a mobile phone and the audio signal is a ringtone of the mobile phone indicating an incoming call.

12. The wireless headset of claim 10, wherein the receiving mechanism for receiving the wake-up signal further comprises a comparing mechanism for comparing the received audio signal with a pre-recorded audio file.

* * * * *